INVENTOR.
FLORENCE NESH
BY
Ernest J Weinberger
ATTORNEY

July 19, 1966 F. NESH 3,261,706

METHOD OF FABRICATING MAGNETIC TAPE

Filed May 4, 1962 2 Sheets-Sheet 2

INVENTOR.
FLORENCE NESH
BY
Ernest J. Weinberger
ATTORNEY

United States Patent Office 3,261,706

Patented July 19, 1966

3,261,706

METHOD OF FABRICATING MAGNETIC TAPE

Florence Nesh, 4707 Connecticut Ave. NW., Washington, D.C.

Filed May 4, 1962, Ser. No. 192,606
6 Claims. (Cl. 117—33)

The invention described herein may be manufactured and used by or for the Government of the United States of America for governmental purposes without the payment of any royalties thereon or therefor. This application is a continuation-in-part of my co-pending application, Serial No. 88,586, filed February 10, 1961, now Patent No. 3,194,640.

This invention relates to crystal and domain rearrangements and phase transitions. One application of the invention is in the preparation of ferromagnetic materials, such as are useful in the manufacture of magnetic recording tapes. Such tapes commonly carry a thin layer of very fine particles of ferromagnetic materials bonded to a flexible base strip, with such fine particles oriented or aligned on the tape by a magnetic field before the bonding agent has fully set or hardened. This method contemplates placing the already magnetized particles on the tape in the most uniformly dispersed condition as is possible. It is understandable that to provide a uniformly dispersed arrangement under even the best circumstances is difficult, but when the particles to be dispersed are themselves magnetic and interact to form small clusters, the problem is greatly magnified. In addition, it is noted that the particles are placed upon a partially hardened or set bonding agent which also complicates the process due in part to the limitation imposed on any further dispersion. Obviously this magnetic coating method would be greatly enhanced and the quality of the resulting tape improved if non-magnetic particles were dispersed on the tape, then bonded and subsequently made magnetic and properly oriented.

Iron oxide is the ferromagnetic material presently in common use on such tapes, and the form of gamma $Fe_2O_3$ is the particular oxide employed. The alpha form of $Fe_2O_3$ shows no ferromagnetism. The industrial methods heretofore employed to prepare gamma $Fe_2O_3$ and $Fe_3O_4$ for magnetic tapes has not been entirely satisfactory because the particles so produced are only partially oriented due to incomplete anisotropy of the crystals and, hence, are not all readily aligned on the tape. It has been found that when the oxide is pre-oriented on the tape, even with a saturating magnetic field, one obtains, with previously prepared ferromagnetic oxides, only about a 50% orientation or alignment of the domains, whereas if this percentage of alignment of the domains could be increased materially, such as to 100% or close to it, the sensitivity of the magnetic tape could be greatly increased.

An object of this invention is to provide an improved method of causing crystal rearrangement and phase transition in molecular structures as by converting compounds from a non-ferromagnetic state to a ferromagnetic state, and which may be easily applied to these metals having a plurality of different oxides.

Another further object is to provide an improved method of preparing ferromagnetic materials for use in magnetic recording and information storing systems, which in use will provide such systems of materially increased sensitivity and accuracy over what has been heretofore possible, and maximum possible alignment of the magnetic domains on magnetic recording and information storing bodies, and which will be relatively simple, practical, rapid and inexpensive.

A further object is to provide an improved relatively simple, practical and inexpensive magnetic recording tape or body, which will have maximum possible sensitivity and accuracy for recording and storing signals and information, and one on which the uniformity of particle dispersion will be a maximum.

Another object is to provide an improved and relatively inexpensive gamma $Fe_2O_3$ for use on magnetic recording tape and bases, which will have maximum possible ferromagnetism, preorientation and prealignment of its domains and a method for providing a tape on which the alpha $Fe_2O_3$ has been uniformly dispersed and subsequently transformed into gamma $Fe_2O_3$.

A still further object is to provide a highly efficient and novel method of ultrasonic cleaning.

Other objects and advantages will be apparent from the following description of examples of the improved method and product, which have been herein disclosed, and the novel features will be particularly pointed out in connection with the appended claims.

The invention accomplishes the desired results with a new and novel use of ultrasonic vibrations.

Figures 1, 2, 3:
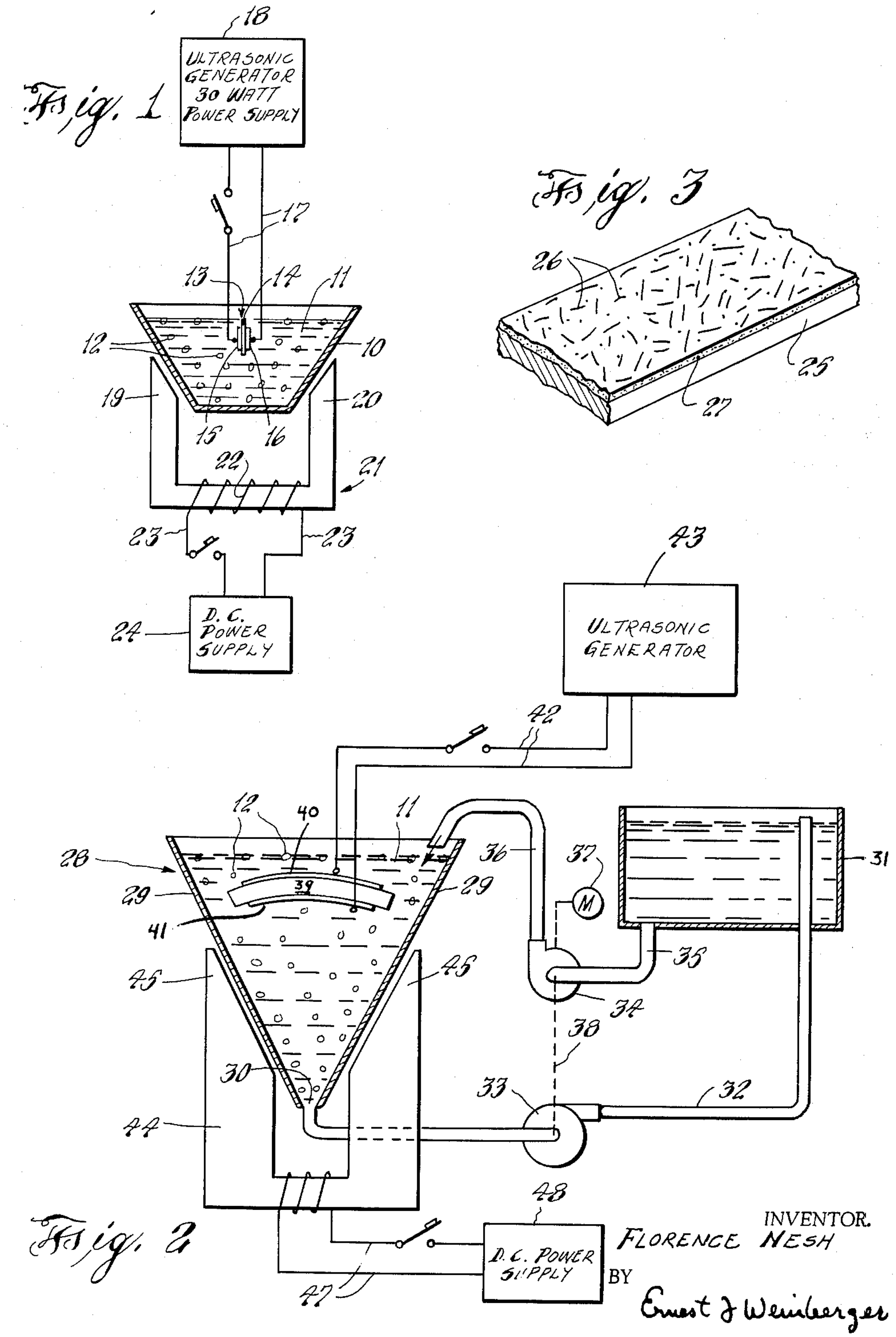
FIG. 1 is a schematic diagram illustrating one example of apparatus useful for performing the invention.
FIG. 2 is a schematic diagram illustrating another example of apparatus useful for performing the invention.
FIG. 3 is a perspective of a small piece of a magnetic tape prepared in accordance with this invention.

The $\alpha$ (alpha) $Fe_2O_3$ is non-ferromagnetic and hence, useless for use on magnetic recording tapes and bodies, whereas the $\gamma$ (gamma) $Fe_2O_3$ and $Fe_3O_4$ are ferromagnetic and useful for magnetic recordings. The gamma $Fe_2O_3$ is the oxide in the state most commonly in current use in magnetic recording and information storage, but as heretofore prepared by reduction and then oxidation, it does not have desired properties including the desired degree of preorientation, domain alignment and crystal rearrangement. The crystal form of alpha $Fe_2O_3$ is a corundum structure, hexagonal and close packed, whereas the crystal form of gamma $Fe_2O_3$ is a spinel structure, cubic and close packed, and in the transformation from the alpha to the gamma form, some Fe ions must migrate from tetrahedral to octahedral positions. In such compounds the magnetic atoms are in general screened from each other by intervening non-magnetic atoms, such as oxygen in a metal oxide. Ferromagnetism can arise in such compounds only when the open lines of interaction between metal atoms are able to form a three dimensional network as they are in the cubic gamma $Fe_2O_3$ but not in the hexagonal alpha $Fe_2O_3$.

A current theory is that this difference is due, in part, to the distance between adjacent atoms containing resultant electron spins. In one case, the electronic moments align in opposition to each other and the resultant magnetic moment is actually at or near zero, which is referred to as anti-ferromagnetism. It is believed that ferromagnetism occurs only when the ratio of distance (D) between neighboring atoms in a metal crystal to the radius ($r$) of the unfilled electron level is an optimum value of 3.0 or slightly greater. For iron this can be expressed as $D/r=3.26$. For manganese, as $D/r=2.94$. The manganese oxide is normally anti-ferromagnetic but may become ferromagnetic when the manganese atoms are forced slightly further apart by the introduction of hydrogen, nitrogen or other atoms into the manganese lattice. At still greater distances between the manganese atoms, the substance becomes merely paramagnetic, as do most similar transition elements and ions with increasing magnetic dilution. If no permanent magnetic dipoles are present, the substance will be diamagnetic, but if permanent magnetic dipoles are present, four possibilities arise:

(1) No interaction between the dipoles yields paramagnetism.

(2) Positive interaction between the dipoles yields ferromagnetism.

(3) Negative interaction yields anti-ferromagnetism, and (4) Simultaneous unequal positive and negative interaction yields ferrimagnetism.

In going from one of the non-ferromagnetic states to a ferromagnetic state, the "spins" must be reversed and aligned, the atomic distances increased or decreased to be within certain limits, and the crystal structure changed to one which prefers a magnetic alignment. One condition, as a rule, affects the others.

Starting with alpha $Fe_2O_3$, which is anti-ferromagnetic, and ending with the gamma form which is ferromagnetic, the change may be due to a spin realignment or increased separation of the atoms by the ultrasonic vibrations, through the cavitation produced by such vibrations in the presence of a magnetic field that prevents too great a magnetic dilution. Cavitation, as understood in hydrodynamics, is the formation of cavities in a liquid, as for instance, when a liquid tears due to under pressure, which can take place in intensive ultrasonic fields. Cavitation takes place if tension within a liquid becomes too great. The liquid tears and cavities form but collapse suddenly when subjected to outside pressure. Much force is thus released and may lead to modification of materials.

The main reason for the depolymerizing effect of ultrasonic vibrations on various substances carried in a liquid is believed to be the mechanical action of the gas bubbles which are formed by the cavitation as well as of vibrating gas bubbles in the liquid. By loading the liquid with a gas, this action is greatly increased. This action by ultrasonic vibrations on a material in a gas loaded liquid in the presence of a strong magnetic field not only induces a crystal rearrangement in the molecular structure by also orients and holds the particles in oriented relation to form a magnetized system that is particularly useful in the metal oxide used to make a magnetic recording tape or body having much greater accuracy and sensitiveness than has been heretofore possible. Whether this is due to crystal rearrangement or flipping of the domains of the particles is not definitely known but it may be some of both.

In the example of apparatus for practicing the invention illustrated in FIG. 1, a container 10 is supplied with a gas loaded liquid 11 carrying finely divided particles 12 of the substance to be converted to a ferromagnetic state. Disposed in the body 11 of gas loaded liquid is a suitable source 13 of ultrasonic vibrations such as a piezo-electric element. Such an element may be a member 14 of quartz or barium titanate, or other piezoelectric material, having metallic surfaces 15 and 16 on opposite faces thereof and connected by wires 17 to a suitable ultrasonic generator 18 of signals. Disposed at opposite sides of the container 10 in close proximity to its walls are the opposite poles 19 and 20 of an electromagnet 21 whose coil or winding 22 is supplied with an energizing current through circuit wires 23 by a D.C. power supply 24. The electromagnet 21, when activated, creates a strong magnetic field in the container 10 and its contents.

In one practice of the invention, using the apparatus illustrated in FIG. 1, the ultrasonic generator 18 was of 30 watt capacity, the gas loaded liquid 11 was carbonated water, and the finely divided particles 12 were dispersed particles of alpha $Fe_2O_3$. The piezoelectric crystal was a one megacycle quartz transducer. When this transducer is activated, the alpha $Fe_2O_3$ that was non-ferromagnetic is converted, substantially entirely, into the gamma $Fe_2O_3$ which is ferromagnetic. The particles produced by such treatment are properly oriented so that they can readily be aligned on the tape. This pre-orientation of the ferromagnetic particles produces a product that when used on a magnetic recording tape has much greater sensitivity, accuracy and response than is possible when the alpha $Fe_2O_3$ is converted into the ferromagnetic state of gamma $Fe_2O_3$ by the heretofore practice of applied heat. A 250 kilocycle piezoelectric crystal may be used with a matched frequency generator or a higher frequency with high power to excite the harmonics. Excellent results are obtained when the particles are subjected to the ultrasonic vibrations and magnetic field for about 2 minutes or longer. A high power and low frequencies and high magnetic field give better results in a minimum of time.

Ultrasonic generators are well known, and hence, they have been illustrated only by block diagrams, but for the purpose of the record such generators are illustrated and described, for example, in U.S. Patent #1,939,712 of December 19, 1933, #1,738,565 of December 10, 1929, and #2,163,649 of June 27, 1939. A power amplifier (not shown) may be included in the circuit, provided by wires 17, if desired, this being disclosed in U.S. Patent #1,738,565 mentioned above. A piece of a magnetic recording tape having a flexible strip 25 of sheet plastic material coated on one face with preoriented ferromagnetic particles 26 prepared according to this invention bonded to the strip by a resin layer 27 is illustrated in FIG. 3.

In the example of the apparatus illustrated in FIG. 2, which may also be used to practice this invention, a container 28, corresponding in function to container 10 of FIG. 1, has downwardly converging side walls 29 that merge into an outlet port 30. A reservoir 31, having its upper level disposed at about the upper level of container 28, is connected near its top by a pipe 32 leading to port 30 and having in it a pump 33 which when operated will withdraw a gas loaded liquid 11 with oxide particles 12 therein, from the bottom of container 28 at port 30 and deliver it to the reservoir. Another pump 34 is connected at its intake side, by pipe 35, to the bottom of the reservoir 31 and at its output side by pipe 36 to the top of container 28 for withdrawing liquid, with oxide particles therein, from reservoir 31 and delivering it to the top of container 28. These pumps thus cause a circulation of the liquid with oxide particles therein through the container 28 continuously and repeatedly. The rotors of pumps 33 and 34 are coupled together and to motor 37 by shaft 38 to insure their concomitant operation.

In the container 28 a piezoelectric element 39 is suitably mounted within the body of liquid, and its faces are provided with electrode layers 40 and 41 that are connected by wires 42 to an ultrasonic generator 43 that supplies high frequency signals or pulses to the opposite electrode layers and cause vibrations of the element 39, as usual in piezoelectric transducers. An electromagnet 44 has its pole pieces 45 disposed at and close to opposite sides of the container walls 29, below the level of the piezoelectric element 39 so as to create a strong magnetic field in the interior of the container 28 below the piezoelectric element 39. The winding 46 of the electromagnet 44 is connected by wires 47 to a D.C. source of power 48. The piezoelectric element 39, with its electroded faces 40 and 41, is concavo-convex in shape, with its concave face on its underside. The center of curvature of this concave face is preferably a short distance above the port 30, so that the ultrasonic vibrations will be focused somewhat on all of the liquid, with oxide particles carried thereby, just before it is withdrawn through port 40 for recirculation. This concentrates the ultrasonic vibrations progressively on limited portions of the circulating liquid with oxide particles, which increases the effectiveness of the action in converting the oxide or other material with the ferromagnetic state. The gas loaded liquid, with finely divided, non-ferromagnetic particles suspended or dispersed therein, when subjected to ultrasonic vibrations in the presence of the magnetic field, in both FIG. 1 and FIG. 2, will be converted into the ferromagnetic state.

While the invention has been described in detail, by way of example, in connection with the conversion of alpha $Fe_2O_3$ into gamma $Fe_2O_3$, it is also applicable to other materials particularly metal oxide, that can by crystal rearrangement or phase transition, be made ferromagnetic, and their domains rearranged or oriented prior to application to a base in the production of magnetic recording bodies. Among the metal oxides that can advantageously be made ferromagnetic in accordance with this invention are the iron oxides ($Fe_2O_3$), the manganese oxides ($Mn_2O_3$, $Mn_3O_4$, $MnO_2$), chromium oxides ($CrO_2$, $CrO_4$, $Cr_2O_7$, and $Cr_2O_3$) and nickel oxides (NiO and $Ni_3O_4$). In addition to carbonated water, mineral oils loaded with nitrogen gas and other gas loaded liquids may be used as the liquid medium that carries the materials to be converted.

At this point it should be noted that under ordinary conditions where supersonic and ultrasonic energy is applied to a fluid as in cleaning, etc., the results indicate that a proportion of the input energy is dissipated entirely without benefit. However, when gas bubbles or entrapped gas is present in the fluid, the same beneficial results are obtained with far less input power. Thus, it is clear that by employing a liquid having therein entrapped gas, a new, unobvious and beneficial result ensues. Although in the particular purpose of the illustrated embodiments it necessitates the use of more than an ultrasonic source and a gas loaded liquid, it should not be construed that one could not properly employ the gas load liquid in other and varied applications of ultra- and supersonics. As for example, in cleaning applications where a liquid is employed and the articles to be cleaned are immersed therein, both the time required and degree of cleaning are improved by loading the liquid with some suitable gas usually one that will not react with either the liquid or the articles being cleaned. Inert gases fall within this category but of course for each particular situation one can always determine a proper and suitable gas. As a cleaning fluid water with the aid of a wetting agent, such as detergent, is the most common used and therefore by carbonating ($CO_2$) the water or adding thereto nitrogen gas the water wtih detergent serve as simple examples for performing the invention. Any one of the apparatus of the illustrated embodiments may be used to perform this function and therefore no additional drawings have been employed.

The invention is also useful for causing other crystal arrangements and domain rearrangements in various materials by providing the nuclei for extensive and intensive cavitation that modifies the materials. The use of the magnetic field applied to the materials being treated, plus the gas loaded liquid, singly and together, in addition to the modifying action of ultrasonic vibrations in creating cavitation in the liquid, greatly improves the modification of the molecular structure by ultrasonic vibrations. It may happen that two components of a molecule which has been torn apart by ultrasonic vibrations, have opposite electrical charges, and then after the ultrasonic vibrations cease, are reunited due to the electrostatic forces between them, but a magnetic field superposed on the molecular electronic field causes the components to remain separated so that crystal rearrangement can occur. For example, ultrasonics cause a loosening of the molecular magnets in nickel rods, so that demagnetization is greatly facilitated. It is also possible to influence the formation of mixed crystals by ultrasonics or to stimulate alloys, which normally crystallize heterogeneously, to form mixed crystals. Even cane sugar has been split up into monosaccharides by ultrasonics. All of these actions are accelerated by gas loaded liquids and magnetic fields in accordance with this invention.

Although up to this point the only force mentioned as being applied to the molecular components is magnetic by nature, it has been found that satisfactory results can also be derived by using a static electric field in place of the magnetic field to exert a force on the separated components. Such a system has been graphically illustrated by the arrangement of FIG. 4 whereas in FIG. 2 a conical container 50 made of an electrically insulative material and having downwardly converging side walls 51 that merge at a restricted base 52. The container is filled with a gas load liquid 53 carrying finely divided particles 54 of the substance to be converted into a ferromagnetic state. As in the device of FIG. 2 a piezoelectric element 55 is disposed and supported in the liquid and has electroded faces 56 that are connected by wires 57 to an ultrasonic generator 58. The element is of a generally parabolic or concavo-convex shape so as to focus the radiated energy into a small confined area. Metallic plates 59 are fastened on opposite side walls 51 either by bolts or by a suitable adhesive (not shown) and connected to a source 60 of direct current. In a manner similar to the force exerted by a magnetic field the static electric field generated across and between the plates 59 keeps the molecular components separated after and during the period they have been acted upon by the cavitation caused by the ultrasonic energy. In view of the fact that both fields create a force which acts on the charged components they may be, and for the purpose of this application, referred to as "force fields," Another form of energy which will create results similar to the "force fields" is microwave or electromagentic energy. The device of FIG. 5 illustrates one embodiment of the invention in which such energy is utilized. The components making up the device are similar to those of FIG. 1 except that the electromagnet and its accessories have been deleted and a parabolic reflector 70, antenna 71 and a microwave generator 72 or radar transmitter substituted therefor. A coaxial cable 73 transfers the energy from the generator to the antenna radiating element 71 and the antenna radiated energy is beamed by the reflector so as to concentrate the radiated energy. The remaining components have been designated by the same reference numerals as in FIG. 1 except a "prime" notation has been added.

Whereas in all the previous illustrations the particles to be converted into a magnetic state are loosely dispersed in the gas-loaded liquid, another system has been devised where the efficiency of the conversion is increased. This is true since in most cases the energy in the form of heat or pressure transferred from the bursting cavitation bubbles to the particles used in exciting the molecules is dissipated by the excited molecule in the form of mechanical energy as for example increased motion, agitation, and Brownian movement and only the remaining transferred energy will be used in exiciting the ions in the crystal structure so as to disrupt them. Therefore, as has been found, if the degree of relative freedom or movement is restricted and confined, a greater proportion of the energy would be available to excite the ions and thereby increase the efficiency of the operation. Another problem particular to the fabrication of magnetic tape can be concurrently solved. In the manufacture of magnetic tapes it is common practice to disperse the magnetic particles on a coated surface of the tape in as uniform a distribution as is possible. However, this does cause the particles to cluster due to their magnetic repulsion and attraction and thereby dilutes the quality of the tape. Or, expressed in another fashion, the quality of the tape could be increased merely by preventing the interaction between the magnetic particles at the time of bonding.

Figure 4:
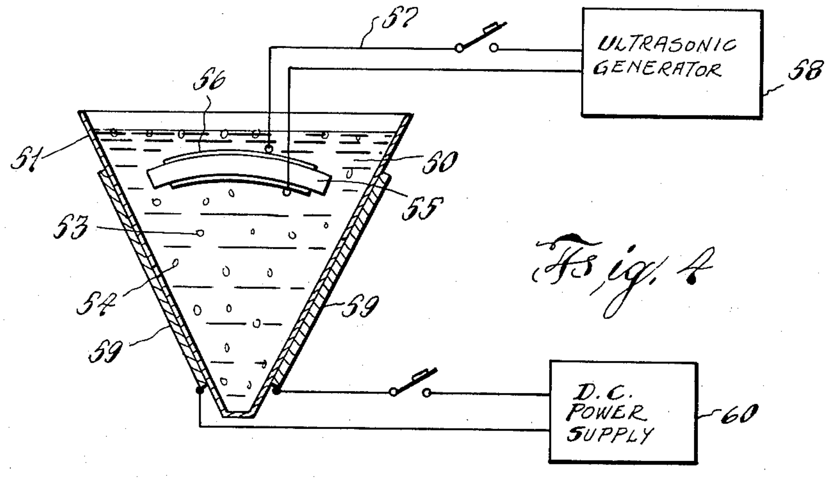
FIGS. 4 and 5 are other schematic diagrams illustrating examples of apparatus useful for performing the invention.
Figure 5:
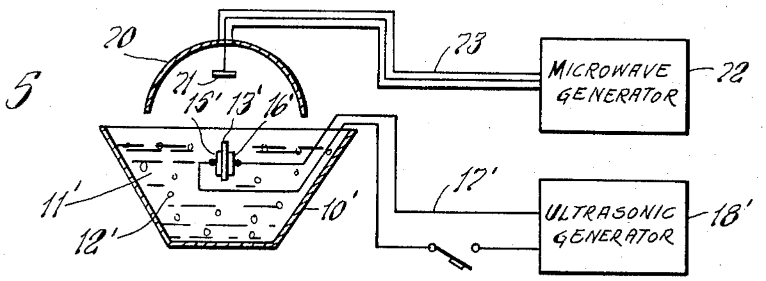
Figure 6:
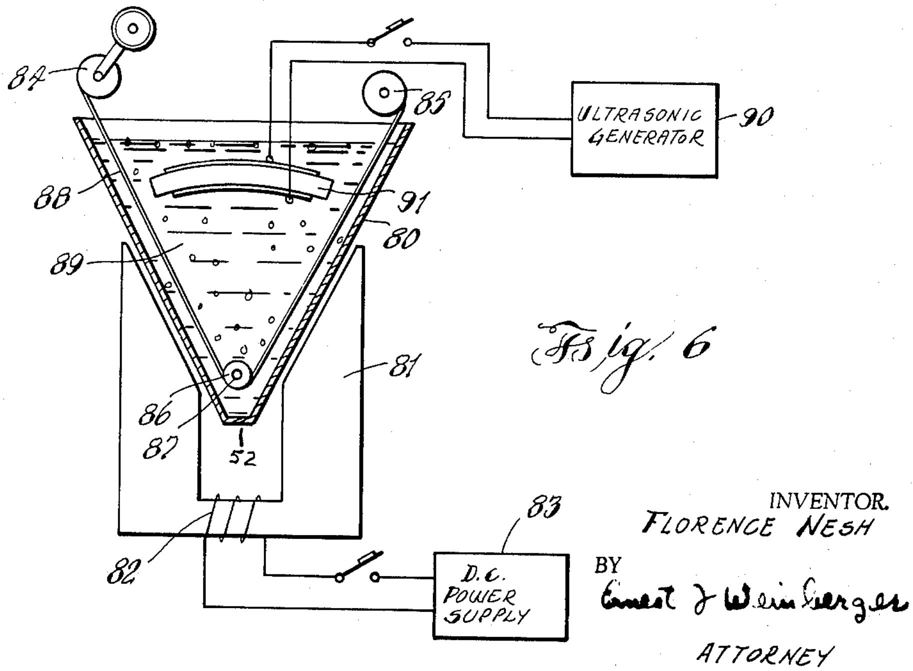
FIG. 6 is a schematic diagram illustrating an example of an apparatus useful for the conversion of a non-magnetic material to a magnetic material while it is bonded to a tape.

The device of FIG. 6 is employed to solve both of these problems and illustrated therein is a device substantially identical to that of FIG. 4, noting that either an electric or magnetic field may be used and for the sake of clarity the magnetic field system has been shown. The container 80 is of a non-magnetic material so that the field induced by the electro-magnet 81 pass through the container and may act upon the material held therein. The directed of the magnetic field generated by the magnet may be varied with respect to the tape in order to permit various magnetic orientations on the tape. The value of this orientation property applies where the purpose or type of tape necessitates a different orientation, as, for example, in video tapes orientation should be lengthwise of the tape, while for audio and instrumentation tapes the orientation should be transverse. In other applications a compromise requires an orientation approximately 45° of the lengthwise direction. The magnet windings 82 are supplied with a D.C. current from the power supply 83. A pair of tape reels 84 and 85 are supported for rotation about their axes in spaced apart relation above the container. One of these reels is a take up reel and is rotated by a motor. A rotatable pulley 86 is mounted on a shaft 87 which is supported in the lower portion of the container in the vertical plane of the tape reels. The tap 88 is initially prepared with one face having a suitable bonding agent or adhesive and then uniformly dispersing thereon the non- or paramagnetic iron oxide (alpha $Fe_2O_3$) particles as by any well known expedient prior to the setting of the bonding agent. After the tape surface is dry, it is placed on one of the reels, as, for example, reel 85 and the free end passed through the gas-loaded liquid (carbonated water) 89, around the pulley 86 and then on take up reel 84. The tape preferably is equidistant from the poles of the electromagnet on either side of the pulley. An ultrasonic generator 90 supplies the electrical energy to the transducer 91 which concentrates its mechanical output toward the lower portion of the container and thereby the alpha $Fe_2O_3$ which is on the surface of the tape is converted with a high degree of efficiency into magnetic gamma $Fe_2O_3$ while it is uniformly dispered thereon. The tape slowly passes from one reel to the other over the pulley and is thereby subjected to the action of the forces as previously described and the resulting magnetic tape is of a uniform superior quality. It should be observed that microwave energy can be substituted for the magnetic or electric fields as has been shown in FIG. 5 and that the particles can also be bonded to any surface not specifically a tape which is itself then submerged in the gas-loaded liquid.

It will be understood that various changes in the materials, step and details which have been herein described and illustrated in order to explain the nature of the invention may be made by those skilled in the art within the principle and scope of the invention as expressed in the appended claims.

I claim:

1. The method of fabricating magnetic tape which comprises coating one surface of a plastic tape with an adhesive, uniformly dispersing on said coating finely divided small particles of a paramagnetic material before said adhesive has set, disposing said tape in a gas loaded liquid and while submerged in said liquid subjecting said tape to ultrasonic vibrations in the presence of a force field.

2. The method according to claim 1, wherein said paramagnetic material is alpha $Fe_2O_3$.

3. The method according to claim 1, wherein said force field is a static electric field.

4. The method of fabricating magnetic tape which comprises coating one surface of a plastic tape with an adhesive, uniformly dispersing on said coating finely divided small particles of a paramagnetic material before said adhesive has set, disposing said tape in a gas-loaded liquid and while submerged in said liquid subjecting said tape to ultrasonic vibrations and electromagnetic energy.

5. The method for efficiently converting a paramagnetic material into a ferromagnetic material which comprises bonding such paramagnetic material in the form of small particles on a surface, submerging said surface with said particles in a gas-loaded liquid, subjecting said surface while so submerged to ultrasonic vibrations and a strong force field.

6. The method of fabricating a magnetic recording tape which comprises coating a surface of a flexible plastic tape with a bonding agent, uniformly dispersing on said coating small particles of alpha $Fe_2O_3$ before said agent has hardened, drying said bonding agent, passing said tape with said coating continuously while submerged through a gas-loaded liquid subjecting the submerged portion of said tape to ultrasonic vibrations and a strong force field whereby said particles will be converted into gamma $Fe_2O_3$.

References Cited by the Examiner

UNITED STATES PATENTS

| | | | |
|---|---|---|---|
| 2,407,315 | 10/1946 | Mason | 252—78 |
| 2,711,901 | 6/1955 | Van Behren | 117—62 |
| 2,796,359 | 6/1957 | Speed | 117—62 |
| 3,024,138 | 3/1962 | Schiott | 134—1 |
| 3,026,215 | 3/1962 | Fukuda et al. | 117—93 |
| 3,033,710 | 5/1962 | Highwater et al. | 134—1 |
| 3,042,543 | 7/1962 | Schuele | 117—62 |

MURRAY KATZ, *Primary Examiner.*

JOSEPH REBOLD, WILLIAM D. MARTIN, RICHARD D. NEVIUS, *Examiners.*

A. H. ROSENSTEIN, *Assistant Examiner.*